United States Patent
Yoshioka et al.

(10) Patent No.: US 7,954,394 B2
(45) Date of Patent: Jun. 7, 2011

(54) RANGE SWITCHING DEVICE

(75) Inventors: Yuhei Yoshioka, Anjo (JP); Kazuyuki Noda, Anjo (JP); Tatsuya Kawamura, Nagoya (JP)

(73) Assignee: Aisin Aw Co., Ltd., Tokyo (JP)

( * ) Notice: Subject to any disclaimer, the term of this patent is extended or adjusted under 35 U.S.C. 154(b) by 382 days.

(21) Appl. No.: 12/209,511

(22) Filed: Sep. 12, 2008

(65) Prior Publication Data
US 2009/0071275 A1 Mar. 19, 2009

(30) Foreign Application Priority Data

Sep. 12, 2007 (JP) ................................. 2007-237131

(51) Int. Cl.
*F16H 59/00* (2006.01)
(52) U.S. Cl. .......................................................... 74/335
(58) Field of Classification Search .................. 477/131, 477/163, 906; 192/3.58, 85.01, 219.4, 219.5, 192/220.2, 220.4; 74/335, 473.11, 473.12, 74/473.26, 473.2; 701/55
See application file for complete search history.

(56) References Cited

U.S. PATENT DOCUMENTS

| | | | |
|---|---|---|---|
| 4,896,568 A | | 1/1990 | Gierer |
| 5,052,247 A | * | 10/1991 | Kato et al. ...................... 477/49 |
| 5,492,509 A | * | 2/1996 | Goates .......................... 475/131 |
| 5,851,164 A | | 12/1998 | Habuchi et al. |
| 6,527,670 B1 | | 3/2003 | Gierer et al. |

FOREIGN PATENT DOCUMENTS

| | | |
|---|---|---|
| JP | 1-502444 A | 8/1989 |
| JP | 6-221422 A | 8/1994 |
| JP | 9-280367 A | 10/1997 |
| JP | 2002-533631 A | 10/2002 |

* cited by examiner

*Primary Examiner* — David D Le
*Assistant Examiner* — David J Hlavka
(74) *Attorney, Agent, or Firm* — Sughrue Mion, PLLC

(57) ABSTRACT

A parking switching valve includes a spool that is movable to a first position and to a second position. The parking switching valve also has an oil chamber that generates a biasing force from a difference in the pressure receiving area between the land portions of the spool. The oil chamber has a second input port to which a line pressure is input while the spool is in the second position. Because the line pressure is input to the second input port, a biasing force is generated so that the spool is held in the second position against a spring. As a result, a parking device is held in a parking release state.

3 Claims, 3 Drawing Sheets

RANGE SWITCHING DEVICE

The disclosure of Japanese Patent Application No. JP 2007-237131 filed on Sep. 12, 2007 including the specification, drawings and abstract is incorporated herein by reference in its entirety.

BACKGROUND OF THE INVENTION

1. Field of the Invention

The present invention generally relates to a range switching device that is applied to an automatic transmission installed in a vehicle and is used for switching between ranges according to an operation performed by the driver of the vehicle, the ranges including a park (P) range, a neutral (N) range, a drive (D) range, and a reverse (R) range. The present invention specifically relates to a range switching device that uses a shift-by-wire method by which the operation performed by the driver of the vehicle is transmitted via an electric signal.

2. Description of the Related Art

Conventional examples of range switching devices using the shift-by-wire method include a range switching device that transmits an operation of the driver of the vehicle to solenoid valves via an electric signal and that switches a range switching valve by operating the solenoid valves in this manner.

It has been proposed to configure such a range switching device so as to have a fail-safe function so that, in the case where all the solenoid valves go into an unenergized state due to a discontinuation of the electric power supply or the like, the range switching device maintains a parking release state as well as the drive (D) range state until the engine is stopped (see Japanese Patent Application Publication No. JP-A-2002-533631).

In the case where all the solenoid valves go into an unenergized state while the vehicle is in the drive (D) range, the range switching device disclosed in Japanese Patent Application Publication No. JP-A-2002-533631 is able to maintain the parking release state until the engine is stopped. However, in the case where all the solenoid valves go into an unenergized state while the vehicle is in the neutral (N) range or the reverse (R) range, the range switching device disclosed in JP-A-2002-533631 has a problem in that it switches the vehicle into the parking state.

SUMMARY OF THE INVENTION

In view of this problem, it is an object of the present invention to provide a range switching device that is able to maintain a parking release state even in the case where all the solenoid valves go into an unenergized state while the vehicle is in the drive (D) range, the neutral (N) range, or the reverse (R) range.

According to one embodiment of the present invention, (refer to, for example, FIGS. 1-3) a range switching device including:

a parking device that is in a parking release state while a source pressure based on a hydraulic pressure from a hydraulic pressure generating source is supplied thereto and is in a parking state while the source pressure is not supplied thereto;

a parking switching valve including a spool that is movable to a first position and to a second position, a biasing member that biases the spool into the first position, a first input port, a second input port that is closed while the spool is in the first position and through which the source pressure is applied to the spool while the spool is in the second position, and an output port that is in communication with the first input port while the spool is in the second position; and a controlling unit for controlling the spool to move between the first position and the second position, wherein while the spool is in the second position, the source pressure is supplied to the parking device via the output port so that the parking device is in the parking release state, and the spool is held in the second position against the biasing member because of the source pressure applied through the second input port, and while the spool is in the first position, the source pressure is not supplied to the parking device so that the parking device is in the parking state.

With this arrangement of the parking switching valve, the source pressure applied through the second input port holds the spool in the second position against the biasing member so that the parking device is held in the parking release state. Thus, even if the controlling unit goes into a non-operational state, it is possible to hold the parking device in the parking release state as long as the source pressure is acting, in other words, as long as the engine of the vehicle is working.

More specifically (refer to, for example, FIGS. 1 and 2), the controlling unit includes a first solenoid valve that outputs a control pressure obtained by adjusting the source pressure and a second solenoid valve that outputs a control pressure obtained by adjusting the source pressure, the parking switching valve includes a first control port and a second control port through which the control pressures are applied to the spool in mutually opposite directions, when the control pressure from the first solenoid valve is applied to the first control port, the spool moves into the second position against the biasing member so that the source pressure through the first input port is supplied to the parking device via the output port and so that the parking device is switched into the parking release state, and the parking device is held in the parking release state because the source pressure through the second input port holds the spool in the second position against the biasing member, and when the control pressure from the second solenoid valve is applied to the second control port while the spool is in the second position, the spool moves into the first position so that the parking device is switched into the parking state.

With this arrangement of the parking switching valve, the source pressure applied through the second input port holds the spool in the second position against the biasing member, so that the parking device is held in the parking release state. Thus, even if the first and the second solenoid valves go into an unenergized state, it is possible to hold the parking device in the parking release state as long as the source pressure is acting, in other words, as long as the engine of the vehicle is working.

In addition, the spool that has been held in the second position is moved into the first position by the control pressure from the second solenoid valve applied to the second control port. Thus, the biasing force of the biasing member is applied to the spool, and also, the control pressure from the second solenoid valve is applied. Consequently, it is possible to improve the movement of the spool, in other words, improve the responsiveness of the switching of the parking device. Further, the spool is moved by the biasing force of the biasing member and by the force that is generated when the control pressure is applied from the second solenoid valve. Thus, it is possible to prevent a malfunction that is caused when a foreign substance gets caught in a gap.

Even more specifically (refer to, for example, FIGS. 1 and 2), the parking switching valve is a first parking switching valve, and the range switching device further includes:

a second parking switching valve that is disposed between the first parking switching valve and the parking device;

a third solenoid valve that outputs a control pressure obtained by adjusting the source pressure; and a detecting unit for detecting when at least one of the first solenoid valve, the second solenoid valve, and the first parking switching valve is in a non-operational state.

In the range switching device, the output port is a first output port, the first parking switching valve includes a second output port that is in communication with the first input port while the spool is in the first position, the second parking switching valve includes another spool that is movable to another first position and to another second position, another biasing member that biases said another spool into said another first position, another first input port that is in communication with the first output port included in the first parking switching valve, another second input port that is in communication with the second output port included in the first parking switching valve, another output port that is in communication with the parking device, and another control port, and according to the detection performed by the detecting unit, the control pressure from the third solenoid valve is applied to said another control port so that said another spool is moved into said another second position and so that the parking device is switched either from the parking state into the parking release state or from the parking release state into the parking state.

With this arrangement, the range switching device includes the third solenoid valve that switches the parking device in the case where the detecting unit has detected that at least one of the first solenoid valve, the second solenoid valve, and the first parking switching valve is in a non-operational state. Thus, even if one or more of the first solenoid valve, the second solenoid valve, and the first parking switching valve go into a non-operational state, the range switching device is able to switch the parking device by operating the third solenoid valve.

DETAILED DESCRIPTION OF THE PREFERRED EMBODIMENTS

Figure 1:
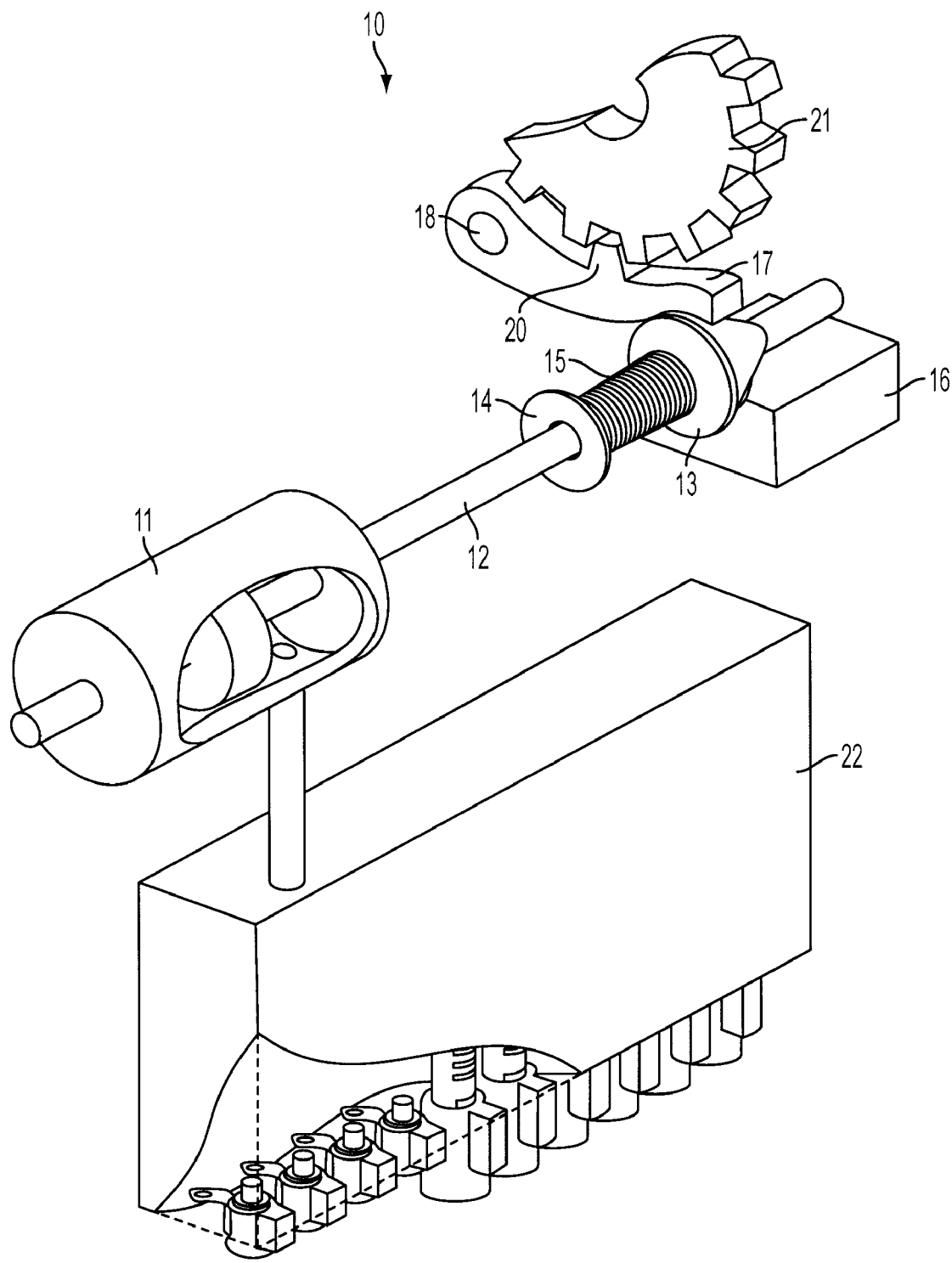
FIG. 1 is a schematic drawing of a parking device according to an embodiment of the present invention.

Exemplary embodiments of the present invention will be explained, with reference to FIGS. 1-3.

A range switching device 1 according to an embodiment of the present invention is incorporated in an automatic transmission A/T (e.g., a stepped automatic transmission or a continuously variable transmission [CVT]) that is installed in a vehicle. The range switching device 1 is configured so as to include: a well known shift lever (not shown in the drawing) with which the driver of the vehicle selects one of a park (P) range, a neutral (N) range, a drive (D) range, a reverse (R) range, and the like; a controlling unit 40 (shown in FIG. 3) that generates a control signal based on a shift signal from the shift lever; a first solenoid valve RS1, a second solenoid valve RS2, and a third solenoid valve RS3 (which are explained in detail later) that are controlled based on the control signal from the controlling unit; and a first parking switching valve 3 and a second parking switching valve 5 (which are explained in detail later) of which the operations are switched by these solenoid valves.

As shown in FIG. 1, of these constituent elements, the first, the second, and the third solenoid valves RS1, RS2, and RS3 and the first and the second parking switching valves 3 and 5 are provided in a valve body 22 within the automatic transmission. Further, as shown in FIG. 1, a parking device 10 is connected to the range switching device 1 (FIG. 2). The range switching device 1 according to the present embodiment uses a shift-by-wire method by which the shift signal and the control signal described above are each in the form of an electric signal. Thus, the explanation above describes that one of the ranges is selected by using the shift lever. However, another arrangement is acceptable in which one of the ranges is selected by operation of a button.

Roughly speaking, the parking device 10 includes a parking cylinder 11, a parking rod 12, a support 16, a parking pole 17, and a parking gear 21. The parking cylinder 11 is connected to the valve body 22. The parking rod 12 is axially movably disposed so as to, on the basal end side thereof, go through the parking cylinder 11, while being movable in the axial direction. A wedge 13 is provided on the distal end side of the parking rod 12, the wedge 13 being in the shape of a circular cone and being loosely fitted so as to be movable in the axial direction. A spring 15 is disposed between a flange part 14 fixed onto the parking rod 12 and the wedge 13. The support 16 is disposed beneath the distal end side of the parking rod 12 and is positioned so that the wedge 13 can be inserted and removed from between the support 16 and the parking pole 17. The parking pole 17 is disposed so as to be swingable in an upward-downward direction, while pivoting on its axis 18 on the basal end side thereof. The parking pole 17 has, on the upper side of the middle portion thereof, a claw part 20 projecting so as to be engageable with and disengageable from the parking gear 21 that is fixed to an output shaft (not shown in the drawing) of the automatic transmission.

As the parking device 10 is configured as described above, when a hydraulic pressure is applied to the parking cylinder 11, the parking rod 12 moves toward the parking cylinder 11 against a biasing force of the spring 15, so that the wedge 13 is removed from the position between the support 16 and the parking pole 17 and so that the parking pole 17 swings in the downward direction in such a manner that the claw part 20 disengages from the parking gear 21, and the parking device 10 is thus in a parking release state. On the other hand, when the hydraulic pressure applied to the parking cylinder 11 is removed, the parking rod 12 moves toward the parking pole 17 because of the biasing force of the spring 15 so that the wedge 13 is inserted between the support 16 and the parking pole 17 and so that the parking pole 17 swings in the upward direction in such a manner that the claw part 20 engages with the parking gear 21, and the parking device 10 is thus in a parking state.

Figure 2:
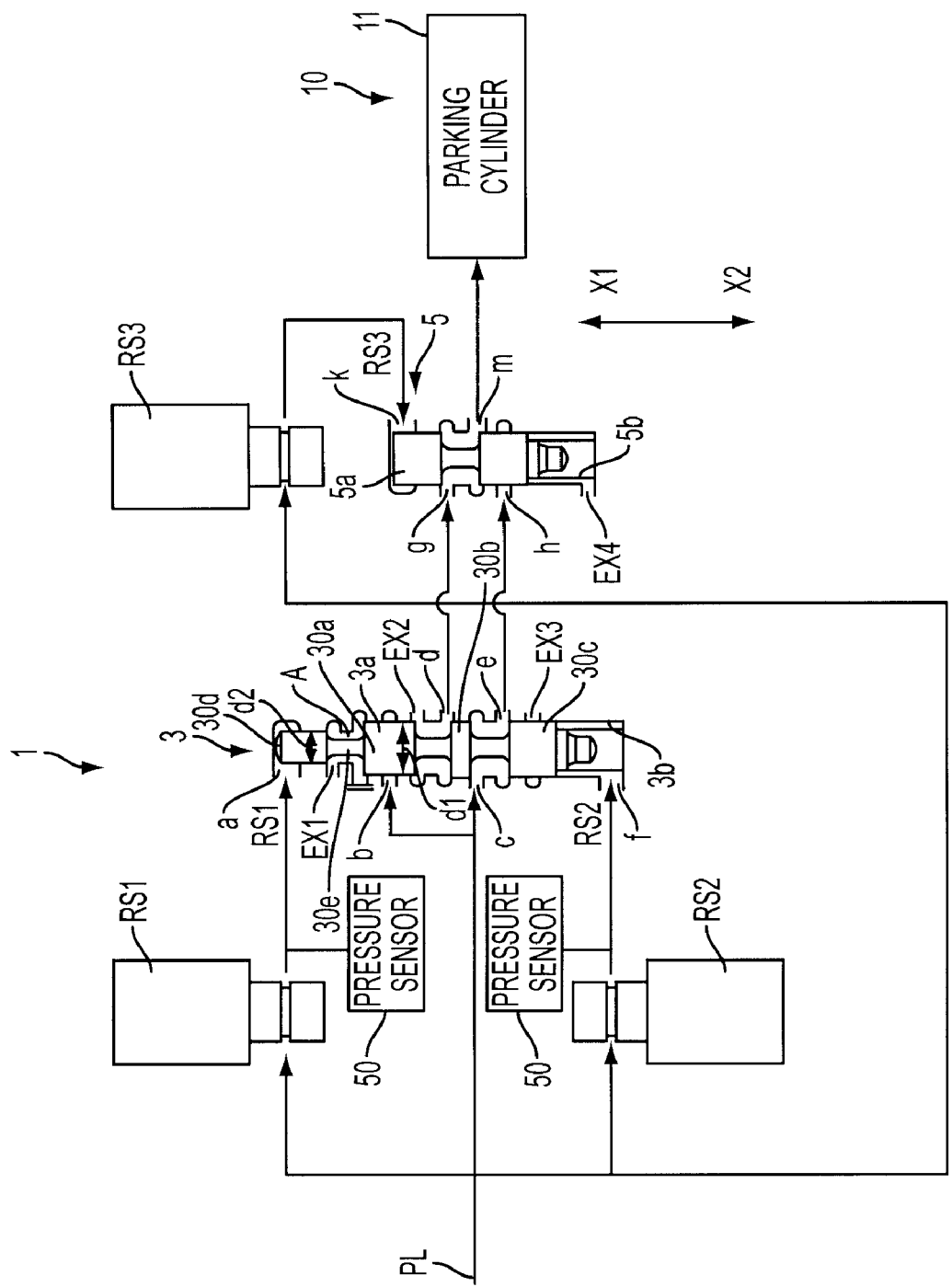
FIG. 2 is a circuit diagram of a range switching device according to an exemplary embodiment of the present invention.
Figure 3:
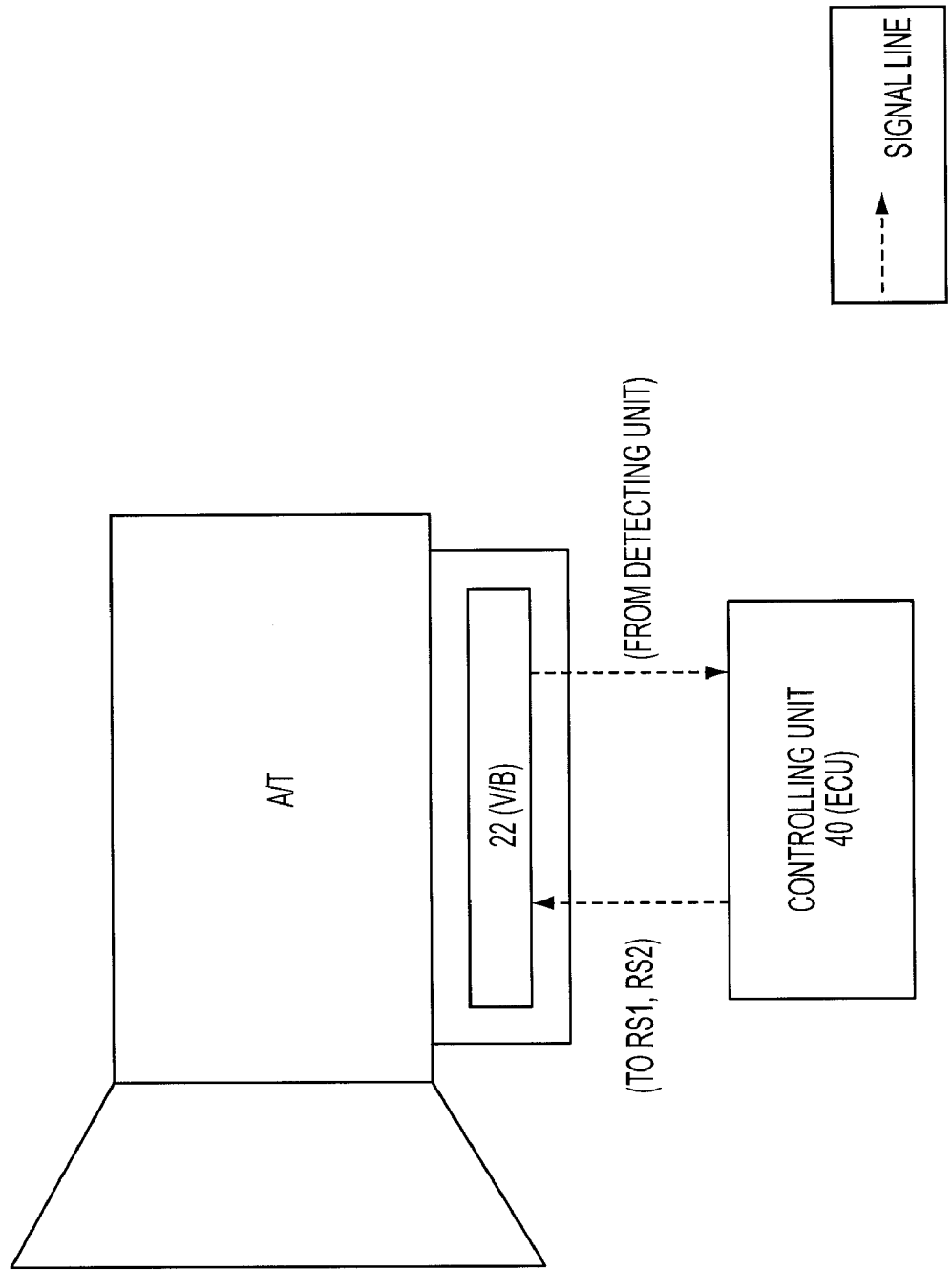
FIG. 3 shows a schematic of an automatic transmission and a controlling unit of the exemplary embodiment.

FIG. 2 shows the range switching device according to an embodiment of the present invention. The range switching device 1 includes the three solenoid valves (i.e., the first solenoid valve RS1, the second solenoid valve RS2, and the third solenoid valve RS3) and the first parking switching valve 3 and the second parking switching valve 5. Each of the three solenoid valves RS1, RS2, and RS3 is a normally-closed valve that is of the three-way type. To each of the three solenoid valves RS1, RS2, and RS3, a supply pressure based on a line pressure (i.e., a source pressure) is supplied, and also, the electric signal from the controlling unit 40 is input according to an operation performed by the driver of the vehicle on the lever or the button.

The first parking switching valve 3 includes a spool 3a and a spring (i.e., a biasing member) 3b that is provided in a compressed state on the side of one end of the spool 3a so as to bias the spool 3a in the X1 direction (i.e., toward the top of FIG. 2). The first parking switching valve 3 also has a first control port a that is positioned on one end of the spool 3a (i.e., the end on the X1 direction side) and to which a control pressure from the first solenoid valve RS1 is applied and a second control port f that is positioned on the other end of the spool 3a (i.e., the end on the X2 direction side) and to which a control pressure from the second solenoid valve RS2 is applied.

Further, the first parking switching valve 3 includes: a drain port EX1; a first input port c and a second input port b to both of which the line pressure is supplied; a drain port EX2; a first output port d of which the connection can be switched by the spool 3a so that the first output port d is in communication either with the first input port c or with the drain port EX2; a drain port EX3; and a second output port e of which the connection can be switched by the spool 3a so that the second output port e is in communication either with the first input port c or with the drain port EX3.

The spool 3a includes three large-diameter land portions 30a, 30b, and 30c and one small-diameter land portion 30d. Each of the large-diameter land portions 30a, 30b, and 30c has an outer diameter d1 that is larger than the outer diameter d2 of the small-diameter land portion 30d. A narrow portion 30e and an oil chamber A are formed between the large-diameter land portion 30a and the small-diameter land portion 30d. The spool 3a is configured in such a manner that, in the case where the spool 3a reaches a position after having moved against the biasing force of the spring 3b so that the line pressure that is input through the second input port b is applied to the narrow portion 30e, the spool 3a is biased by a force that is stronger than the biasing force of the spring 3b in the X2 direction (i.e., in the direction opposite to the biasing direction of the spring 3b), due to the difference in the outer diameter (i.e., d1-d2) between the large-diameter land portion 30a and the small-diameter land portion 30d, in other words, due to the difference in the pressure-receiving area.

The first parking switching valve 3 is configured in such a manner that, when the control pressure from the first solenoid valve RS1 is applied to the first control port a, the spool 3a is moved against the biasing force of the spring 3b, from a first position where the spool 3a is biased by the spring 3b to a second position in the X2 direction, and also, the connection is switched so that the first input port c is in communication with the first output port d, and further, the spool 3a is held in the second position because the line pressure is applied to the second input port b.

Also, the first parking switching valve 3 is configured in such a manner that, when the control pressure from the second solenoid valve RS2 is applied to the second control port f and the biasing force of the spring 3b is applied to the spool 3a, the spool 3a that has been held in the second position because of the line pressure applied to the second input port b now moves into the first position, so that the connection is switched so that the first input port c is in communication with the second output port e.

The second parking switching valve 5 includes a spool 5a and a spring 5b that is provided in a compressed state on the side of one end of the spool 5a so as to bias the spool 5a in the X1 direction. The second parking switching valve 5 also has a control port k that is positioned on one end of the spool 5a (i.e., the end on the X1 direction side) and to which a control pressure from the third solenoid valve RS3 is applied. Further, the second parking switching valve 5 includes: a first input port g connected to the first output port d included in the first parking switching valve 3; a second input port h connected to the second output port e included in the first parking switching valve 3; and an output port m of which the connection can be switched by the spool 5a so that the output port m is in communication either with the first input port g or with the second input port h.

The second parking switching valve 5 is configured in such a manner that, while the control pressure from the third solenoid valve RS3 is not applied to the control port k, the spool 5a is in a first position so that the first input port g is in communication with the output port m. When the control pressure is applied to the control port k so that the spool 5a is moved in the X2 direction, the spool 5a is in a second position so that the second input port h is in communication with the output port m.

Next, the operation of the range switching device 1 configured as described above will be explained, with reference to FIG. 2. The first, the second, and the third solenoid valves and the control pressures from these solenoid valves will be referred to by using the same reference characters RS1, RS2, and RS3, respectively.

When the engine is started (i.e., the vehicle is in the park [P] range), the first solenoid valve RS1 is in the OFF state, and the second solenoid valve RS2 is in the ON state. Thus, as shown in FIG. 2, in the first parking switching valve 3, the spool 3a is in the first position because the control pressure RS2 is applied to the second control port f, and the spool 3a is biased by the spring 3b. On the other hand, the third solenoid valve RS3 is in the OFF state. Thus, in the second parking switching valve 5, the spool 5a is in the first position where the spool 5a is biased by the spring 5b.

In this situation, as for the line pressure PL, in the first parking switching valve 3 the first input port c is in communication with the second output port e so that the line pressure LP is output from the first parking switching valve 3; however, in the second parking switching valve 5 the second input port h is closed, so that the line pressure PL is not output from the second parking switching valve 5. Also, the second input port b included in the first parking switching valve 3 is closed, while the first output port d is in communication with the drain port EX2. In addition, the output port m included in the second parking switching valve 5 is also drained via the first input port g. Consequently, the line pressure PL is not output from the range switching device 1 to the parking cylinder 11 included in the parking device 10. Accordingly, the parking device 10 is in the parking state.

When the driver of the vehicle performs an operation on the lever or the button so that the vehicle goes into either the drive (D) range, the neutral (N) range, or the reverse (R) range, the second solenoid valve RS2 goes into the OFF state, and the first solenoid valve RS1 goes into the ON state. As a result, in the first parking switching valve 3, because the control pressure RS1 is applied to the first control port a, the spool 3a moves in the X2 direction so as to reach the second position. The third solenoid valve RS3 is in the OFF state. In the second parking switching valve 5, the spool 5a remains in the first position where the spool 5a is biased by the spring 5b.

In this situation, the line pressure PL is output to the parking cylinder 11 because the first input port c is in communication with the first output port d in the first parking switching valve 3 and because the first input port g is in communication with the output port m in the second parking switching valve 5. Consequently, the parking device 10 is in the parking release state. Also, the line pressure PL is supplied to the oil chamber A that is formed between the large-diameter land portion 30a and the small-diameter land portion 30d of the spool 3a, via the second input port b included in the first parking switching valve 3. As a result, the spool 3a is biased in the X2 direction and is held in the second position. Further, the second output port e included in the first parking switching valve 3 is in communication with the drain port EX3. The second input port h included in the second parking switching valve 5 is also drained.

When the driver of the vehicle performs an operation on the lever or the button so that the vehicle goes back into the park (P) range, the first solenoid valve RS1 goes into the OFF state, and the second solenoid valve RS2 goes into the ON state. As a result, in the first parking switching valve 3, because the control pressure RS2 is applied to the second control port f and because the spool 3a is biased by the spring 3b, the spool 3a is moved from the second position to the first position by a force that is stronger than the biasing force generated by the line pressure PL being applied to the oil chamber A. In this situation, like in the situation described above, the line pressure PL is not output to reach the parking cylinder 11. Thus, the parking device 10 is in the parking state.

While the vehicle is being driven in the drive (D) range or while the vehicle is in the neutral (N) range or the reverse (R) range, if the first, the second, and the third solenoid valves RS1, RS2, and RS3 are all turned off due to a failure (i.e., go into a non-operational state) because of an electrical disconnection or the like, in the first parking switching valve 3 the spool 3a holds itself in the same position because of the line pressure PL being supplied to the oil chamber A, without the control pressure RS1 and the control pressure RS2. As a result, the line pressure PL is output to the parking cylinder 11, so that the parking device 10 is held in the parking release state. Consequently, the vehicle is able to keep running while being in the drive (D) range, the neutral (N) range, or the reverse (R) range, until the engine is stopped and the line pressure no longer exists.

In this situation, when the engine of the vehicle is stopped and the line pressure PL no longer exists, in the first parking switching valve 3, because no hydraulic pressure is supplied to the ports, the spool 3a is moved from the second position to the first position by the biasing force of the spring 3b. Consequently, if the engine is started again, the parking device 10 is in the parking state.

As another example, let us discuss a situation in which the first solenoid valve RS1 is turned off due to a failure (i.e., goes into a non-operational state) while the parking device 10 is being switched from the parking state into the parking release state. In other words, a hydraulic pressure sensor 50 (i.e., a detecting unit) is provided between the first solenoid valve RS1 and the first control port a, and the controlling unit 40 has detected that, although a signal to put the first solenoid valve RS1 into the ON state has been transmitted, no hydraulic pressure detecting signal is transmitted from the hydraulic pressure sensor 50, and the controlling unit 40 has therefore judged that the first solenoid valve RS1 is turned off due to a failure. In this situation, the spool 3a included in the first parking switching valve 3 is in the first position explained above, and the line pressure PL is not output to the parking cylinder 11.

In this situation, when the controlling unit 40 has judged that the first solenoid valve RS1 is turned off due to a failure, the controlling unit 40 transmits a signal to put the third solenoid valve RS3 into the ON state to the third solenoid valve RS3. As a result, in the second parking switching valve 5, because the control pressure RS3 is applied to the control port k, the spool 5a is moved from the first position to the second position against the biasing force of the spring 5b. In this situation, the spool 3a included in the first parking switching valve 3 is in the first position, so that the first input port c is in communication with the second output port e. On the other hand, the spool 5a included in the second parking switching valve 5 is in the second position, so that the second input port h is in communication with the output port m. Consequently, the line pressure PL is output to the parking cylinder 11 via the first parking switching valve 3 and the second parking switching valve 5. Accordingly, the parking device 10 is switched from the parking state into the parking release state.

As yet another example, let us discuss a situation in which the second solenoid valve RS2 is turned off due to a failure (i.e., goes into a non-operational state) while the parking device 10 is being switched from the parking release state into the parking state. In other words, a hydraulic pressure sensor 50 is provided between the second solenoid valve RS2 and the second control port f, and the controlling unit 40 has detected that, although a signal to put the second solenoid valve RS2 into the ON state has been transmitted, no hydraulic pressure detecting signal is transmitted from the hydraulic pressure sensor 50, and the controlling unit 40 has therefore judged that the second solenoid valve RS2 is turned off due to a failure. In this situation, the spool 3a included in the first parking switching valve 3 is in the second position as explained above, and the line pressure PL is output to the parking cylinder 11.

In this situation, when the controlling unit 40 has judged that the second solenoid valve RS2 is turned off due to a failure, the controlling unit 40 transmits a signal to put the third solenoid valve RS3 into the ON state to the third solenoid valve RS3. As a result, in the second parking switching valve 5, because the control pressure RS3 is applied to the control port k, the spool 5a is moved from the first position to the second position against the biasing force of the spring 5b. In this situation, the spool 3a included in the first parking switching valve 3 is in the second position, so that the first input port c is in communication with the first output port d. On the other hand, the spool 5a included in the second parking switching valve 5 is in the second position, so that the second input port h is in communication with the output port m. Consequently, although the line pressure PL is output from the first parking switching valve 3, because the first input port g included in the second parking switching valve 5 is closed, the supply of the line pressure PL to the parking cylinder 11 is blocked. Accordingly, the parking device 10 is switched from the parking release state into the parking state.

In the present embodiment, the hydraulic pressure sensors 50 are provided between the first solenoid valve RS1 and the first control port a and between the second solenoid valve RS2 and the second control port f, respectively, so that it is possible to detect the failure where one or more the solenoid valves are turned off. However, it is acceptable to have another arrangement in which a hydraulic pressure sensor 50 that serves as the detecting unit is provided between the second parking switching valve 5 and the parking cylinder 11. With this arrangement, when the controlling unit 40 has detected that, although a signal to put the first solenoid valve RS1 or the second solenoid valve RS2 into the ON state has been transmitted, no hydraulic pressure detecting signal is transmitted from the hydraulic pressure sensor 50, the controlling unit 40 is able to detect not only a failure where the first solenoid valve RS1 or the second solenoid valve RS2 is turned off, but also a non-operational state of a valve stick or the like in the first parking switching valve 3. Further, because it is possible to provide the hydraulic pressure sensor 50 on the outside of the valve body 22 as shown in FIG. 1, it is possible to keep the valve body compact.

As explained above, in the range switching device 1 according to an embodiment of the present invention, in the first parking switching valve 3, the line pressure PL applied through the second input port b holds the spool 3a in the second position against the spring 3b, so that the parking device 10 is held in the parking release state. Thus, even if the first solenoid valve RS1 and the second solenoid valve RS2 go into an unenergized state, it is possible to hold the parking device 10 in the parking release state as long as the line pressure PL is acting, in other words, as long as the engine of the vehicle is working.

Further, the spool 3a that has been held in the second position is moved into the first position by the control pressure RS2 from the second solenoid valve RS2 applied to the second control port f. As a result, to the spool 3a, the biasing force of the spring 3b is applied, and also, the control pressure RS2 from the second solenoid valve RS2 is applied. Consequently, it is possible to improve the movement of the spool 3a, in other words, improve the responsiveness of the switching of the parking device 10. Further, the spool 3a is moved by the biasing force of the spring 3b and by the force that is generated when the control pressure RS2 is applied from the second solenoid valve RS2. Thus, it is possible to prevent a malfunction that is caused when a foreign substance gets caught in a gap.

In addition, the range switching device 1 according to an embodiment of the present invention includes the third solenoid valve RS3 that switches the parking device 10 in the case where the detecting unit has detected that either the first solenoid valve RS1, the second solenoid valve RS2, or the first parking switching valve 3 is in a non-operational state. Thus, even if one or more of the first solenoid valve RS1, the second solenoid valve RS2, and the first parking switching valve 3 go into a non-operational state, the range switching device 1 is able to switch the parking device 10 by operating the third solenoid valve RS3.

In the present embodiment explained above, the two solenoid valves are used as the controlling unit. However, it is acceptable to use a four-way type solenoid valve that is able to switch the hydraulic pressures supplied to the first control port a, the second control port f, and the drain port. Alternatively, it is also acceptable to use a pressure-adjusting solenoid valve and a switching valve that switches the control pressure from the pressure-adjusting solenoid valve between the first control port a and the second control port f. In other words, it is possible to apply the present invention to a configuration with any other type of controlling unit as long as it is possible to make the spool 3a included in the first parking switching valve 3 move.

In the description above, the line pressure is used as the source pressure. However, it is acceptable to use a supplied pressure obtained by adjusting the line pressure. In other words, it is possible to apply the present invention to a configuration with any other type of source pressure as long as it is possible to cause the parking cylinder to operate and to hold the spool with a force that is stronger than the biasing force of the spring included in the parking switching valve.

Further, in the description above, the hydraulic pressure sensors 50 are used as the detecting unit. However, it is acceptable to have another arrangement in which the resistance values of the solenoid values are measured so that it is possible to detect a non-operational state based on changes in the resistance values. In other words, it is possible to apply the present invention to a configuration with any other type of detecting unit as long as it is possible to judge that one or more of the solenoid valves are in a non-operational state.

The range switching device according to the present invention can be used in an automatic transmission or the like that is installed in vehicles such as cars, trucks, buses, and agricultural machines. In particular, the range switching device according to the present invention is applicable as a range switching device that uses the shift-by-wire method by which an operation performed by the driver of the vehicle is transmitted via an electric signal. For example, the range switching device according to the present invention is desirable in a situation that requires improvement on a fail-safe function that works even if the supply of the electric power is discontinued and all the solenoid valves are in an unenergized state.

What is claimed is:

1. A range switching device comprising:
   a parking device that is in a parking release state while a source pressure based on a hydraulic pressure from a hydraulic pressure generating source is supplied thereto and is in a parking state while the source pressure is not supplied thereto;
   a parking switching valve including a spool that is movable to a first position and to a second position, a biasing member that biases the spool into the first position, a first input port, a second input port that is closed while the spool is in the first position and through which the source pressure is applied to the spool while the spool is in the second position, and an output port that is in communication with the first input port while the spool is in the second position; and
   a controlling unit for controlling the spool to move between the first position and the second position, wherein
   while the spool is in the second position, the source pressure is supplied to the parking device via the output port so that the parking device is in the parking release state, and the spool is held in the second position against the biasing member because of the source pressure applied through the second input port, and
   while the spool is in the first position, the source pressure is not supplied to the parking device so that the parking device is in the parking state.

2. The range switching device according to claim 1, wherein
   the controlling unit includes a first solenoid valve that outputs a control pressure obtained by adjusting the source pressure and a second solenoid valve that outputs a control pressure obtained by adjusting the source pressure,
   the parking switching valve includes a first control port and a second control port through which the control pressures are applied to the spool in mutually opposite directions,
   when the control pressure from the first solenoid valve is applied to the first control port, the spool moves into the second position against the biasing member so that the source pressure through the first input port is supplied to the parking device via the output port and so that the parking device is switched into the parking release state, and the parking device is held in the parking release state because the source pressure through the second input port holds the spool in the second position against the biasing member, and
   when the control pressure from the second solenoid valve is applied to the second control port while the spool is in the second position, the spool moves into the first position so that the parking device is switched into the parking state.

3. The range switching device according to claim 2, wherein the parking switching valve is a first parking switching valve, the biasing member is a first biasing member, the spool is a first spool, the output port is a first output port, and the control port is a first control port, and the range switching device further comprises:
- a second parking switching valve that is disposed between the first parking switching valve and the parking device;
- a third solenoid valve that outputs a control pressure obtained by adjusting the source pressure; and
- a detecting unit for detecting when at least one of the first solenoid valve, the second solenoid valve, and the first parking switching valve is in a non-operational state, and wherein the first parking switching valve includes a second output port that is in communication with the first input port while the first spool is in the first position, the second parking switching valve includes a second spool that is movable to a third position and to a fourth position, a second biasing member that biases said second spool into said third position, a third input port that is in communication with the first output port included in the first parking switching valve, a fourth input port that is in communication with the second output port included in the first parking switching valve, a second output port that is in communication with the parking device, and the second control port that is in with the third solenoid valve, and according to the detection performed by the detecting unit, the control pressure from the third solenoid valve is applied to said second control port so that said second spool is moved into said fourth position and so that the parking device is switched either from the parking state into the parking release state or from the parking release state into the parking state.

* * * * *